United States Patent [19]

Gräff

[11] 4,038,054
[45] July 26, 1977

[54] ADSORPTION APPARATUS

[76] Inventor: Roderich W. Gräff, Kollwitzweg 19, 61 Darmstadt-Arheilgen, Germany

[21] Appl. No.: 517,808

[22] Filed: Oct. 24, 1974

Related U.S. Application Data

[63] Continuation of Ser. No. 343,915, March 22, 1973, abandoned.

[30] Foreign Application Priority Data

Mar. 25, 1972 Germany .............................. 2214662

[51] Int. Cl.$^2$ ...................... B01D 53/00; B01D 53/26
[52] U.S. Cl. .......................................... 55/179; 55/389
[58] Field of Search ...................... 55/33, 58, 62, 179, 55/389; 137/624.18, 625.46

[56] References Cited

U.S. PATENT DOCUMENTS

| | | | |
|---|---|---|---|
| 2,992,703 | 7/1961 | Vasan et al. | 55/70 X |
| 3,091,335 | 5/1963 | Goard | 210/386 |
| 3,487,608 | 1/1970 | Graff | 55/33 |

Primary Examiner—Frank A. Spear, Jr.
Assistant Examiner—Ferris Lander
Attorney, Agent, or Firm—Michael S. Striker

[57] ABSTRACT

An apparatus for the adsorption of molecules from a gaseous medium comprises at least two adsorption chambers for receiving an adsorbent; at least one pair of ducts forming inlets and outlets associated with each of said adsorption chambers; means for passing the gaseous medium selectively into and out of said ducts and adsorption chambers so as to form an adsorption circuit; means for passing a hot gaseous regeneration medium into and out of said ducts and adsorption chambers so as to form a regeneration circuit; valve means associated with said ducts for selectively including one or the other pair of ducts and adsorption chambers in said adsorption circuit or in said regeneration circuit, the said valve means comprising a pair of cooperating and aligned, relatively rotatable valve discs, and openings provided in said valve discs for connection with said ducts forming the adsorption and regeneration circuit, all of said openings being equidistant from the central axis of said discs and the said openings being associated in peripheral direction of the discs, alternatingly, with the ducts forming the adsorption circuit and with the ducts forming the regeneration circuit.

7 Claims, 3 Drawing Figures

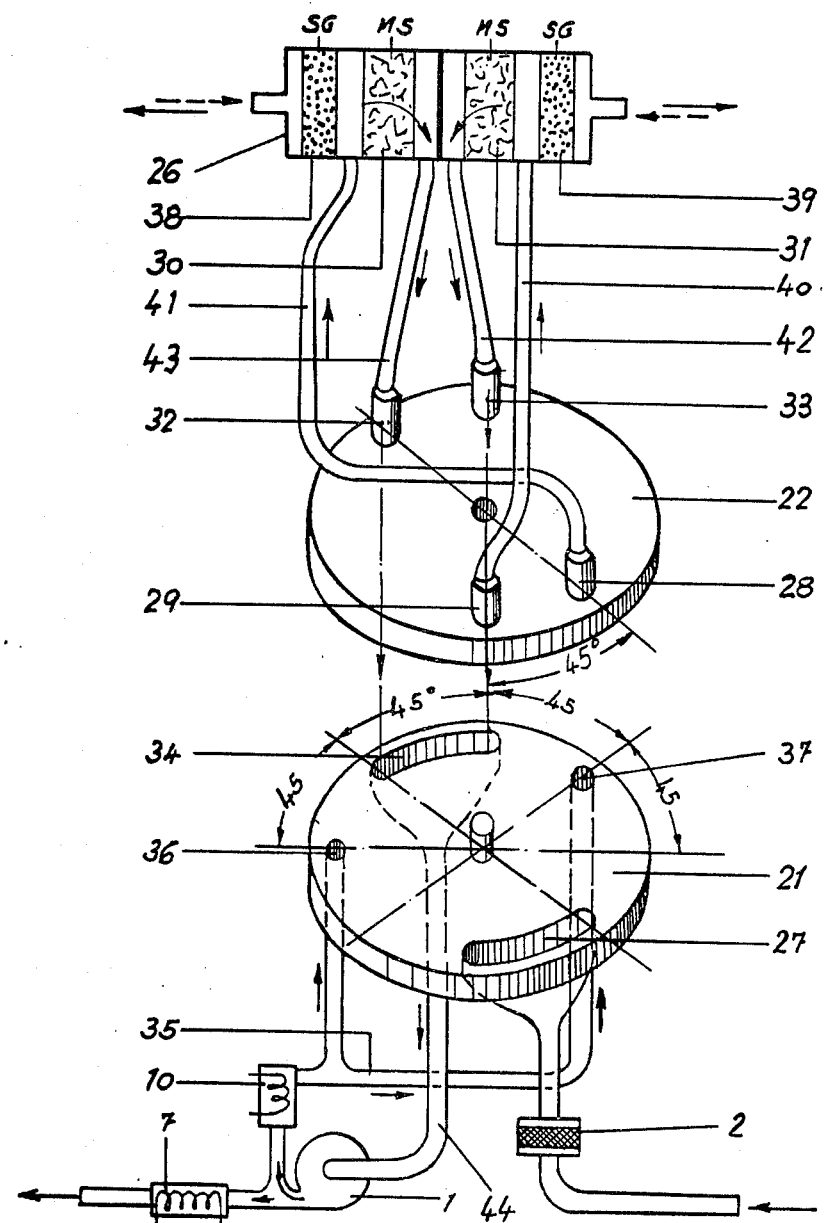
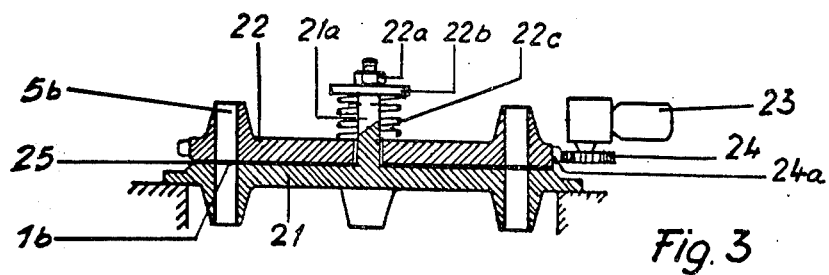
Fig. 2
Fig. 3

ADSORPTION APPARATUS

This is a continuation of application Ser. No. 343,915, filed March 22, 1973, now abandoned.

BACKGROUND OF THE INVENTION

The invention concerns an apparatus for adsorption of molecules from a gaseous medium wherein only one two-way valve is used for selectively connecting the ducts of the chambers containing the absorbents with the inlet and outlet ducts of an adsorption circuit and a regeneration circuit.

This type of device is for instance used for adsorbing humidity from air.

Usually air is dried by passing it through a chamber filled with an adsorbent such as silica gel or a molecular sieve. The air then passes its humidity to the adsorbent. As soon as the adsorbent has taken up a certain percentage of humidity, it must be regenerated. The simplest way to this is passing air at a higher temperature of for instance 250° C through the chamber.

In this kind of device each chamber is then alternatingly connected with the adsorption circuit and with the regeneration circuit. In order to carry out the adsorption and regeneration without interruption it is necessary to employ at least two chambers. In order to alternatingly make the chambers either of the adsorption circuit or of the regeneration circuit operative, two-way valves are employed. The cost of these two-way valves however is compartively high.

It has already been suggested to use a two-way valve having two relatively rotatable valve discs which turn about a common axis and of which one disc has openings for the inlet and outlet of the adsorption circuit and the regeneration circuit while the other disc has openings for the connection with the adsorption chambers. This prior art circuit has the two openings for the connection of one chamber in each case on different radii from the center and thus at a differential distance from the pivot of the valve discs. The exterior dimensions of the valve must therefore be comparatively large. A reduction of the size of the valve would result in a narrowing of the open cross section of the apertures of the discs. Furthermore it is impossible with this device to improve the adsorption and regeneration operation by connecting two adsorption circuits in a predetermined time and space relationship.

It is therefore an object of the present invention to provide an apparatus which permits use of a two-way valve of the type described which has compartively limited exterior dimensions but nevertheless a comparatively large inside flow diameter. It is another object of the invention to provide this type of device for the connection of two adsorption chambers in the adsorption circuit.

SUMMARY OF THE INVENTION

These objects are solved by an apparatus which comprises at least two adsorption chambers for receiving an adsorbent; at least one pair of ducts forming inlets and outlets associated with each of said adsorption chambers; means for passing the gaseous medium selectively into and out of said ducts and adsorption chambers so as to form an adsorption circuit; means for passing a hot gaseous regeneration medium into and out of said ducts and adsorption chambers so as to form a regeneration circuit; valve means associated with said ducts for selectively including one or the other pair of ducts and adsorption chamber in said adsorption circuit or in said regeneration circuit, the said valve means comprising a pair of cooperating and aligned, relatively rotatable valve discs, and openings provided in said valve discs for connection with said ducts forming the adsorption and regeneration circuit, all of said openings being equidistant from the central axis of said discs and the said openings being associated in peripheral direction of the discs, alternatively, with the ducts forming the adsorption circuit and with the ducts forming the regeneration circuit.

BRIED DESCRIPTION OF THE DRAWINGS

FIG. 2 shows another embodiment of an adsorption device according to the invention and of a two-way valve wherein two different adsorbents are used; and FIG. 3 shows the disc valve employed in FIGS. 1 and 2 in a cross section.

BRIEF DESCRIPTION OF THE INVENTION AND PREFERRED EMBODIMENTS

Figure 1:
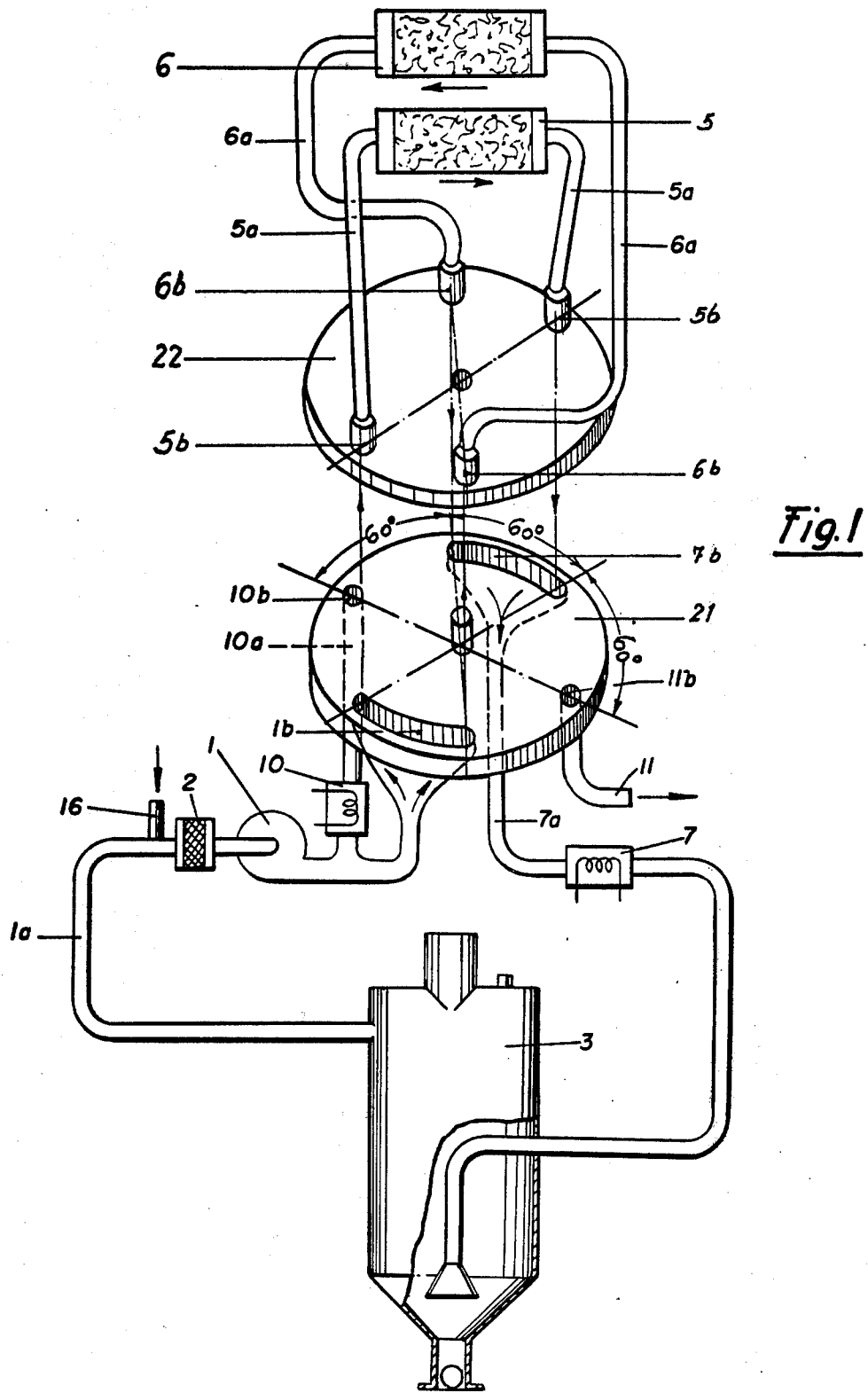
FIG. 1 shows a first embodiment of the adsorption device of the invention in an exploded view, this device having only one two-way valve.

In the apparatus of the invention all openings are arranged as already emphasized at the same distance from the pivot of rotation of the discs. In the direction of the periphery of the discs, the openings are alternatingly connected with either one or the other circuit and adsorption chamber. This permits to reduce the exterior of the valve considerably. It enables also switching the valve in both directions by a short shuttle movement instead of going on with the switching movement in only one direction. This furthermore enables arranging the chambers in a stationary position above the valve and connecting them with the valve by tubings or similar instead of attaching the chambers directly to the valve and rotating them with the upper disc.

A first embodiment of the invention provides for two adsorption chambers with a displcement for the openings of the ducts leading to the chambers by 60° relative to the axis of rotation. The openings for the inlets and outlets of the adsorption circuit and regeneration circuit are similarly arranged. The two-way valve is switched by a rotary movement of one valve half against the other by an angle of 60°. This embodiment is provided for the case where it is desired to extend the adsorption time relative to the regeneration time. This can be accomplished by enlarging the openings for the inlets and outlets of the adsorption circuit in peripheral direction by a radial angle which corresponds to the angular distance of each two openings of the connecting ducts of the two chambers and at the same time to the angular distance of the openings for the inlets and outlets of the regeneration circuit relative to the outlet of the adsorption circuit. Thus a switch movement is possible by which two adsorption chambers are connected in parallel in the adsorption circuit. Other switch positions are possible in which one of the chambers is in the regeneration circuit while the other remains in the adsorption circuit. Thus the total time for the adsorption operation will be extended relative to the time of the regeneration since the regeneration can be performed comparatively rapidly.

In another embodiment the radial angle of the enlarged openings is not larger than 45° while the other two openings are within the range of the enlarged openings, i.e. within the same radial angle. A switch position is thus possible where, with connection of one chamber into the regeneration circuit, only one of the ducts for it is opened while the other remains closed. This permits the use of the device in an adsorption apparatus wherein a regeneration circuit is formed by branching off from the adsorption circuit following passing of the medium to be treated through the adsorption chamber. The branched-off portion is then passed through a heating means and the heated-up medium is then used for regeneration. In this device the chambers are filled with an adsorbent which is effective also in a higher temperature range, such as a molecular sieve. Besides, in the inlet ducts of these chambers there is provided a secondary chamber, each, which is opened to the open air and which is filled with an adsorbent effective only at the lower portion of the temperature range. This may for instance be silica gel.

This kind of device permits connecting via the two-way valve, in each case, one pair of chambers filled with two different adsorbents and to make it part of the adsorption and regeneration circuit in such a manner that the regeneration air traverses successively both chambers of one pair, that is both types of adsorbents. On the other hand, the air to be treated passes only through the adsorbent of the other pair of chambers which adsorbent is also effective at the higher temperature range. The air introduced from the outside for replenishment, on the other hand, passes also through the lower temperature adsorbent.

Reference is made in the first place to FIG. 1 which shows a device where a blower 1 introduces by suction the air to be dried through a filter 2. The air may be obtained for intance from a granulating hopper 3 of a plastics processing machine. The air is forced through a two-way valve to be described later into an adsorption chamber 5 which is filled with an adsorbent, for instance, a molecular sieve or silica gel. In this chamber the humidity is removed from the air by the adsorption process. The air then passes through a heater 7 and flows back to the place of use, for instance, the granulating hopper 3.

The blower 1 at the same time forces the air through a heater 10 where it is heated up to the regeneration temperature. The regeneration air then flows through the adsorption chamber 6 which is filled with adsorbent. The heated air in this chamber takes up the humidity held by the adsorbent and passes it through an outlet pipe 11 into the atmosphere. This then results in drying of the adsorbent in chamber 6.

As soon as the regeneration of the adsorbent in chamber 6 is completed which way for instance be after about one-half hour, the chamber 5 may be subjected to regeneration while the adsorbent in chamber 6 takes over the drying of the air current.

The valve of the invention is as illustrated in FIG. 3 constituted by two circular valve discs 21, which is the active or control disc, and 22, which forms the carrier disc. The lower disc 21 supports the upper disc 22 on a centrally disposed pivot 21a. The upper discs is slightly pressed against the lower disc by a spring 22c which is kept under tension by a nut 22a and a washer 22b. The upper disc can be rotated by sliding on the lower disc 21. An electromotor 23 for this purpose acts on the upper valve disc 22 by means of a pinion 24 which interlocks with the periphery of the disc through a ring gear 24a.

The duct 1a of the adsorption circuit leads into an opening 1b in the lower valve disc 21. The outlet of the duct 7a ends in an opening 7b and the inlet 10a of the regeneration circuit ends in an opening 10b while the corresponding outlet 11 ends in an opening 11b. In the sealing surface 25 of the upper valve disc 22, ducts 5a of the adsorption chamber lead into openings 5b while ducts 6a of the adsorption chamber 6 lead into openings 6b. All openings are on the same peripheral circle and are displaced against each other by 60°. As appears from FIG. 3, the openings in the upper valve 22 and those in the lower valve 21 may be connected in alignment with each other.

When the device is in the position angularly displaced from that shown in FIG. 1, the blower 1 brings in air to be dried from the place of use of instance a granulating funnel by suction through the filter 2 and forces the air through the duct 1a and the opening 1b in the lower valve disc 21, the opening 5b in the upper valve disc 22 and the duct 5a in the chamber 5 filled with the adsorbent. Through a further duct 5a and an opening 5b the air passes into the opening 7b of the lower valve disc and then through the duct 7a and the heater 7 from where it flows back to the place of use. The blower 1 at the same time forces part of the air into the heater 10 where it is heated up to the regeneration temperature. The hot air then passes through the duct 10a, the opening 10b in the lower valve disc 21, the opening 6b in the upper valve disc 22 and the duct 6a until it reaches the adsorption chamber 6. There it causes the regeneration of the adsorbent. The air then flows out through the other connecting duct 6a into the opening 6b and from there into the opening 11b in the lower valve disc 21 and finally passes through the outlet tube 11 into the atmosphere.

Upon completion of the regeneration operation, the motor 23 is started which turns the upper valve 22 by means of the pinion 24. This causes the freshly regenerated adsorption chamber to be placed into the adsorption circuit while the chamber 5 in which humidity has accumulated may be placed into the regeneration circuit or remain in the adsorption circuit.

It will be understood that the reference to upper and lower valve disc relates to the particular embodiment shown in the drawing. In practical operation the two valves may also be arranged in opposite order. It is desirable to increase the adsortion time relative to the regeneration time because the regeneration of an adsorption chamber which for instance contains the spent adsorbent can be effected more rapidly than the charging of a freshly regenerated adsorption chamber with, for instance, the gaseous medium to be dried which may contain a substantial amount of humidity. This is accomplished by a two-way valve as shown in FIG. 1, wherein the openings 1b and 7b of the adsorption circuit in the lower valve disc 21 are enlarged in peripheral direction by a radial angle of 60°. The angular distance of the openings 10b and 11b from the openings 7b or 1bk is likewise 60°. The openings 5b and 6b in the upper valve disc 22 are likewise moved together to a distance of about 60°. In a particular switch position such as shown in FIG. 1 both adsorption chambers 5 and 6 can then be included in the adsorption circuit, that is in the circuit for drying air. In this position the two openings 5b and 6b are in alignment with the enlarged openings 7b and 6b For regeneration it is only necessary to move the upper valve disc 22 by 60° in the one or the other direction. This leaves one of the two chambers 5 or 6 in the adsorption circuit while the other chamber then forms part of the regeneration circuit as discussed previously. The usual cycle time for air drying is for instance 15 min. for regeneration of one chamber in one end position 15 minutes position in series of both chambers in the central position for adsorption purposes and 15 minutes regeneration of the other chamber in the other end position.

The adsorption device illustrated in FIG. 1 has only a single blower 1 which conveys both the air to be dried and the regeneration air. However, this is accompanied by the drawback that the regeneration air which is discharged through the outlet tube 11 into the atmosphere must be replaced. This is done in the otherwise closed drying air circuit by bringing in by suction a corresponding amount of air from the atmosphere through an inlet tube 16. The thus received humid atmospheric air accordingly forms an additional load for the drying circuit and particularly for the adsorbent in both adsorption chambers.

FIG. 2 illustrates a device which solves the problem to avoid an additional load on the adsorbent. This is accomplished by provision of secondary adsorption chambers. The two-way valve of the invention can be used for this kind of device with only minor modification.

To simplify the structure, the four adsorption chambers 30, 31 and 38, 49 are placed in a common receptacle 26. The air to be dried passes through a filter 2 into the enlarged slot opening 27 in the lower valve disc 21 and from there through the two duct openings 28 and 29 in the upper disc 22 and through the ducts 40 and 41 into the container of the adsorbent. There the air passes in each case through an adsorption chamber 30 or 31 which is filled with a molecular sieve (MS) as adsorbent and is there subjected to drying. Via ducts 42 and 43, the air then passes into two openings 32 and 33 in the upper valve disc 22. The two openings lead to an enlarged oening 34 in the lower valve disc 21. The air is passed from there through duct 44 by means of the blower 1. The air current is then branched and part of it passes to the plane of use through the heater 7 while another part passes into the heater 10 and into a duct system 35 and moves into the openings 36 and 37 of the lower valve disc 21. However in the illustrated position the openings are closed.

As soon as one of the adsorption chambers filled with the molecular sieve must be regenerated the upper valve disc is turned by 45°. The width of the openings 27 and 34 corresponds to a rotary angle of 45°. Likewise the distance of the openings 36 and 37 from the opening 34 and the distance of the openings 32 and 33 or openings 28 and 29 is 45°.

If we assume that the disc 22 is then rotated by an angle of 45° in clockwise direction, the following occurs. The adsorption chamber 31 filled with the molecular sieve is then connected with the regeneration air which is forced from the blower 1 through heater 10 and a branch of the duct system 35 and further through openings 37 and 33 and duct 42. The direction of the air is opposite to the direction of the arrow shown in the Figure. The air is thus forced through the molecular sieve. Since the air cannot leave the container 26 through the connecting duct 40 which leads to the two-way valve; it must escape through the secondary adsorption chamber 39 which is filled with silica gel. This results in a regeneration, both of the molecular sieve and of the silica gel of the right-hand pair of adsorption chambers 31 and 39. The amount of air lost for the drying circuit is automatically replaced on the other side of the container 26 from the atmoshere. This is done by sucking it in through the chamber 38 and the silica gel disposed therein and thus immediately subjecting it to a drying operation.

As soon as the regeneration is completed the upper valve disc is turned back by 45° causing again both adsorption chambers 30 and 41 to be included in the adsorption circuit. As soon as regeneration is necessary of the second adsorption chamber 30 the valve disc 22 is again turned in the same direction, that is counterclockwise by an angle of 45°.

Since the upper valve disc in the examples can be moved by a maximum of 120° it is possible to mount the chambers holding the adsorbents in a stationary manner in a support structure instead of mounting them on the valve disc. This is in particular of advantage in case of large adsorption chambers. In that case it is sufficient that the outlets of the chambers in each case are connected through flexible connections with the ducts and openings on the two-way valve.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended:

1. An apparatus for drying synthetic plastic particles to be supplied to a plastics processing machine, comprising hopper means for accommodating the particles to be dried; a two-chamber adsorption arrangement for removing moisture from a humid working fluid passing therethrough; duct means communicating with said hopper means and said adsorption arrangement; valve means interposed into said duct means and operative for including at least one of said chambers into a closed adsorption circuit with said hopper means and for selectively including either of said chambers into a regeneration circuit, said valve means including two discs having contact surfaces in sealing contact with one another and being mounted on one another for limited relative angular displacement about a common axis normal to said contact surfaces, said discs being formed with openings which communicate with said surfaces and are distributed along a circle having a center located on said axis, said openings alternatingly communicating with the duct associated with the respective chambers and with the respective circuits; blower means in said duct means for passing said humid working fluid from said hopper means through said adsorption circuit to dehumidify said working fluid and for passing a regeneration fluid through said regeneration circuit; and heating means in said duct means and including a first heating arrangement for heating the dehumidified working fluid downstream of the respective chamber that is included in the adsorption circuit so as to convert said dehumidified fluid into fresh working fluid for drying the particles in said hopper means, and a second heating arrangement for heating the fluid upstream of the respective chamber included in the regeneration circuit so as to convert said fluid into a regeneration fluid.

2. The apparatus of claim 1 wherein said openings of the adsorption circuit are peripherally enlarged to extend over a radial angle corresponding to the angular distance between two openings of the ducts connecting with the adsorption chamber and corresponding also to the angular distance of the ducts forming the regeneration circuit from one duct of the adsorption circuit.

3. The apparatus of claim 2, wherein the radial angle formed by said enlarged openings is at most 45° and wherein the angular distance of said two openings at most corresponds to said radial angle.

4. The apparatus of claim 1, wherein said blower means includes a single blower in said duct means communicating with said hopper means.

5. The apparatus of claim 1, wherein said disc of said valve means whose openings communicate with said chambers is mounted on the other disc for said limited angular displacement about said common axis; wherein said chambers are stationary; and wherein said duct means communicating said openings of said one disc with said chambers are flexible so as to compensate for said limited angular displacement of said disc.

6. The apparatus of claim 1 wherein the regeneration circuit is formed by a branch from said adsorption circuit following the chamber associated therewith, which branch includes said second heating arrangement, and wherein a broad temperature range adsorbent is disposed in said chambers and wherein a secondary chamber, is associated with each chamber which secondary chamber is connected with the outer atmosphere and filled with an adsorbent which is effective only in the lower portion of said broad temperature range.

7. The apparatus of claim 6 wherein said secondary chambers contain silica gel is adsorbent while said chambers contain a molecular sieve as adsorbent.

* * * * *